United States Patent [19]

New et al.

[11] Patent Number: 4,809,212

[45] Date of Patent: Feb. 28, 1989

[54] HIGH THROUGHPUT EXTENDED-PRECISION MULTIPLIER

[75] Inventors: Bernard J. New, Los Gatos; Timothy J. Flaherty, Santa Clara, both of Calif.

[73] Assignee: Advanced Micro Devices, Inc., Sunnyvale, Calif.

[21] Appl. No.: 747,079

[22] Filed: Jun. 19, 1985

[51] Int. Cl.⁴ ............................................... G06F 7/52
[52] U.S. Cl. ..................................... 364/757; 364/754
[58] Field of Search ......................... 364/754, 757–760

[56] References Cited

U.S. PATENT DOCUMENTS 4,574,421  6/1988  Bosshart ............................... 364/757

FOREIGN PATENT DOCUMENTS 59245    4/1982  Japan ..................................... 364/757
58-542   4/1984  Japan ..................................... 364/754
8602181  4/1986  PCT Int'l Appl. .................. 364/754

OTHER PUBLICATIONS

Chevillat et al, "Pipelined Hardware Multiplier with Extended Precision", IBM Technical Disclosure Bulletin, vol. 23, No. 9, 2/81, pp. 4322–4323.

Primary Examiner—Gary V. Harkcom
Assistant Examiner—Tan V. Mai
Attorney, Agent, or Firm—Kenneth B. Salomon

[57] ABSTRACT

A multiplier formed as a single integrated circuit chip generates in consecutive clock cycles the single-precision partial products of multiple-precision operands. Provision of an on-chip temporary register and "wrap-back" path avoids transmitting and externally storing intermediate results so that no clock cycles are used solely for data-transfers or other "overhead". Consecutive double-precision multiplications can be performed concurrently so that complete quadruple-precision products are generated every four cycles.

10 Claims, 1 Drawing Sheet

HIGH THROUGHPUT EXTENDED-PRECISION MULTIPLIER

CROSS-REFERENCE TO CO-PENDING APPLICATION

Related, co-pending application of particular interest to the present invention is U.S. Patent Application Ser. No. 747,073 filed 06/19/85 on behalf of Bernard J. New and Timothy J. Flaherty entitled "Parallel Multiplier Array with Foreshortened Sign Extension", now U.S. Pat. No. 4,748,582, which description is incorporated herein.

BACKGROUND OF THE INVENTION

1. Field of the Invention

This invention relates to digital electronic multiplier circuits, and more particularly, to a monolithic integrated circuit multiplier, having an on-chip pipeline register and an on-chip wrap-back data path, capable of generating at each clock cycle a single-precision portion of the extended-precision product of the multiple-precision operands.

2. Description of Prior Art

Typically, arithmetic operations are performed by an integrated circuit arithmetic-logic unit (ALU) having only single-precision capability. Multiple-precision operations are performed by having the ALU repeatedly perform single-precision operations on suitably scaled single-precision operands. Temporary storage of the partial results is provided by registers external to the ALU chip. Scaling operations are also typically performed by external circuitry. Such off-chip data-transfers and the limited, single-precision capability of the ALU require a large number of ALU clock cycles to perform an extended-precision multiplication involving double-precision operands.

In addition to slowness, provision in the prior art of external registers and off-chip data paths requires a large number of chips which must be interconnected during board manufacture. This results in larger design and assembly costs, lower reliability, and larger space requirements, than would be the case of a single chip capable of performing extended-precision multiplication.

Interest in multiple-precision arithmetic operations has recently been intensified by the need to efficiently perform such operations in a variety of digital signal processing applications such as digital filtering and fast fourier transformations. In addition, the Institute of Electrical and Electronic Engineers (IEEE) has announced a draft standard 10.1 (P754) for 53-bit mantissa double-precision numbers. However, even these important developments do not warrant the use of dedicated central processing units (CPUs) to perform the extended-precision operations. Accordingly, there is an unmet need for a cost-effective, efficient extended-precision multiplier.

SUMMARY OF THE INVENTION

A monolithic intergrated circuit extended-precision multiplier capable of generating at each clock cycle a single-precision partial-product of multiple-precision operands is provided by the instant invention. An on-chip pipeline (temporary-result) register and an on-chip "wrap-back" path avoids the need for external storage of temporary results or for any off-chip intermediate data transfers. The self-contained multiplier circuit provided by the instant invention can generate in four consecutive clock cycles the four single-precision words comprising the complete product of two double-precision operands. Provision of the temporary register allows initiation of a second multiple-precision multiplication concurrently with the processing of the present multiplication so that a useful result is generated at every clock cycle of the multiplier with no clock cycles being used solely for data-transfers or other "overhead" operations. Accordingly, the multiplier of the instant invention wastes no clock cycles and realizes a very high throughput.

In an illustrative embodiment, a multiplier with a clock cycle of 50 nanoseconds capable of processing 64-bit double-precision operands is provided by the instant invention. Thus a 32-bit single-precision partial product word is generated every 50 nanoseconds and the entire 128-bit product is generated in 200 nanoseconds. A 32-×32-bit multiplier array operates on the 32 most-significant bit portion and the 32 least-significant bit portion of the operands which are stored in on-chip 32-bit registers.

The least-significant single-precision product word is first formed and stored in the temporary register to provide a two clock-cycle pipeline delay so that the product words remaining from the preceding multiplication can be generated before generation of the product words for the current multiplication. The single-precision "cross-product" words are formed next and subjected to a single clock cycle pipeline delay and are generated following the least-significant product word. The most-significant single-precision product word is last formed and stored in the temporary register to provide a two clock-cycle pipeline delay while the "cross-product" words are being generated and is last generated during the seventh clock cycle following application of the least-significant portions of the operands. However, since these operands were applied concurrently with the generation of the first "cross-product" word from the preceding multiplication, a partial product word is generated at every clock cycle with no interruptions.

Multiplexers are provided on the multiplicand and multiplier data paths as well as on the product data path so that the multiple-precision operands and product may be transferred onto and off the chip in 32-bit words.

DESCRIPTION OF THE PREFERRED EMBODIMENT

Figure 1:
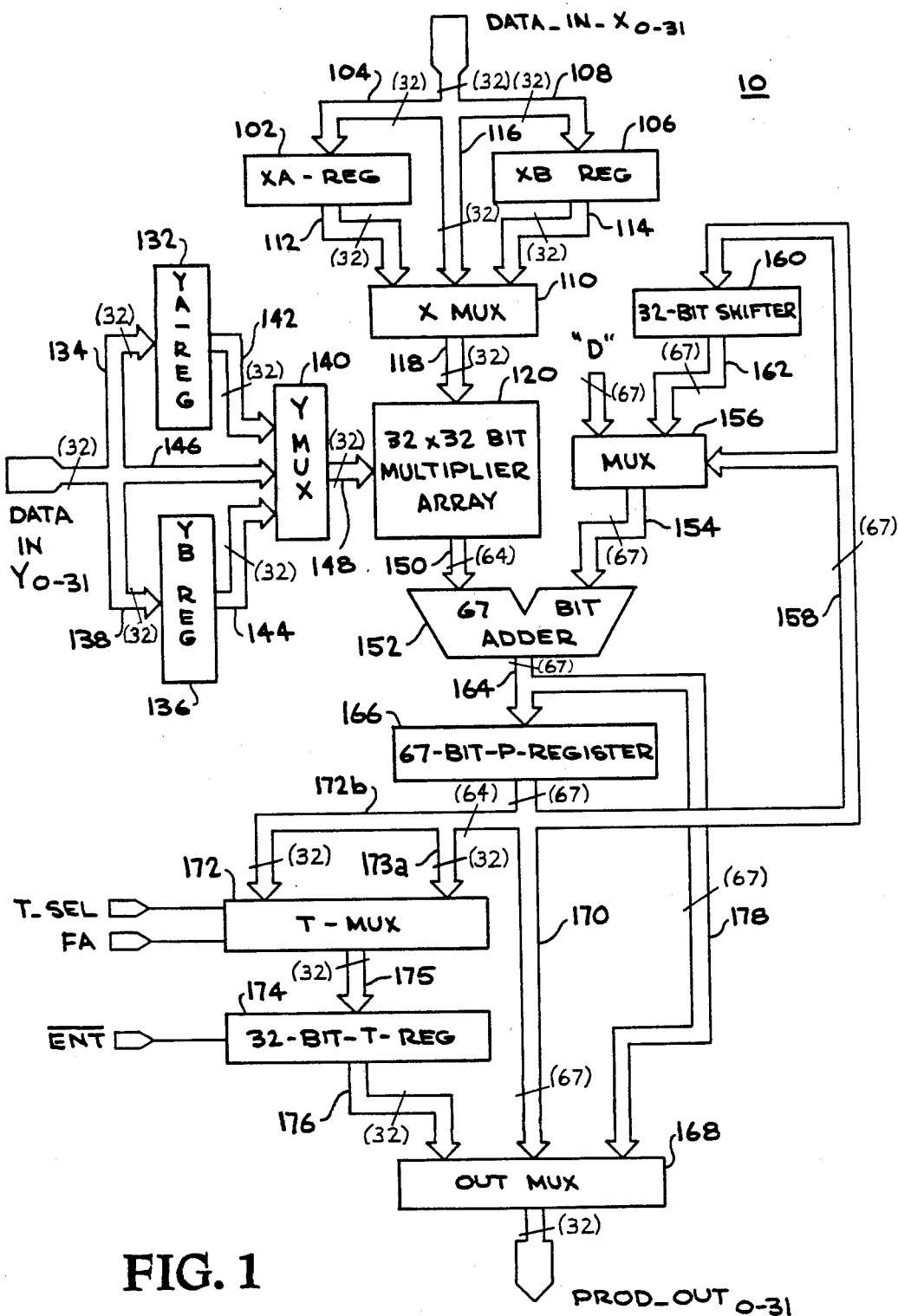
FIG. 1 is a functional block diagram of an extended-precision parallel multiplier according to the instant invention.

A 32-×32-bit parallel multiplier 10 according to the instant invention is shown in functional block diagram form in FIG. 1. A set of thirty-two input terminals DATA_IN_$X_{0-31}$ receives a set of signals representing either the least-significant or most-significant portion of the 64-bit multiplicand word which are conducted to an XA register (XA_REG) 102 via a 32-conductor data bus 104 and to an XB register (XB REG) 106 via a 32-bit conductor data bus 108. (For convenient notation, in the drawings there are many data paths near which there are numbers enclosed by parentheses. These enclosed numbers indicate the width of the adjacent data path, or the number of signals which can be transferred in parallel on the data path. The input control IPC and various other control blocks, while not shown in FIG. 1, nor is their design and operation described in detail herein, are well-known to those skilled in the art.) XA_REG 102 and XB_REG 106 receive a control signal from an input control (IPC), not shown, which causes the thirty-two signals applied thereto to be stored in the register. In this manner, the 32 least-significant bits of the multiplicand word are applied first to the DATA_IN_$X_{0-31}$ terminals of multiplier 10 and stored in the XA_REG 102 and then the 32-most-significant bits of the multiplicand word are applied to the DATA_IN_$X_{0-31}$ and stored in the XB_REG 106.

An X multiplexer (X_MUX) 110 receives the 32-bit contents of the XA_REG 102 via a 32-bit conductor data bus 112, the 32-bit contents of the XB_REG 106 via a 32-conductor data bus 114, and the signals applied to the DATA_IN_$X_{0-31}$ terminals via a 32-conductor data bus 116. The latter being an alternative "feed-through" data path which can be selected by the control signal received by the X_MUX 110. The X_MUX 110 receives a control signal from the IPC which causes one of the thirty-two signals conducted on data bus 112, 114 or 116 to be generated on a 32-conductor data bus 118 to a 32-×32-bit multiplier array 120.

A set of 32-conductor data busses 134, 138, 142, 144, 146 and 148, multiplexer Y_MUX 140, and registers YA_REG 132 and YB_REG 136 is provided to store and transmit the least-significant and most-significant portion of the 64-bit multiplier word applied at a set of thirty-two input terminals DATA_IN_$Y_{0-31}$ to the 32-×32-bit parallel multiplier 10. These elements, as illustrated in FIG. 1, are interconnected and operate in the same manner as the busses, multiplexers and registers described above in connection with the reception, storage and transmission of the 64-bit multiplicand word. In this manner the least- or most-significant 32-bit portion of the multiplier word can be conducted via bus 148 to the 32-×32-bit multiplier array 120.

The 32-×32-bit multiplier array 120 is the subject of a related, co-pending application U.S. Ser. No. 747,073 entitled "Parallel Multiplier Array with Foreshortened Sign Extension," filed 06/19/85 on behalf of Bernard J. New and Timothy J. Flaherty and assigned to the assignee of the instant application. The multiplier array 120 generates on a 64-conductor data bus 150 the 64-bit partial product word of the 32-bit multiplicand word present on the data bus 118 and the 32-bit multiplier word present on the data bus 148.

A 67-bit partial product adder 152 receives at a first input the 64-bit product via the data bus 150. A 67-bit word is conducted to a second input of adder 152 via a 67-conductor data-bus 154 from a multiplexer (MUX) 156. MUX 156 receives a control signal from a control block, not shown, which causes the MUX 156 to select either the 67-bit word conducted on an internal "wrapback" path via a 67-conductor bus 158 or the 67-bit word conducted on the wrap-back path right-shifted by thirty-two bit positions by a 32-bit shifter 160 and conducted to MUX 156 via bus 162 with thirty-four leading sign-extended bits appended. Alternatively, a 67-bit word consisting of all ZERO's may be selected by the control signal to cause MUX 156 to apply an all-ZERO word to the second input of adder 152 via bus 154.

In this manner, the 67-bit partial-product adder 152 generates on a 67-conductor data bus 164 a 67-bit partial product word formed from the sum of the 64-bit product word generated by the multiplier array 120 and the contents of a 67-bit product register (P_REG) 166 which receives and stores the most-recently generated partial product via data bus 164, stores the same, and generates on the wrap-back path data bus 158 the 67-bit word stored therein. The 67-bit contents of the P-register 166 may be down-scaled by a factor of $2^{32}$ by the 32-bit shifter 160, as required, before addition to the 64-bit product word as will be described below in connection with Table II.

The 67-bit contents of the P-register 166 is also conducted to a first input of an output multiplexer (OUT_MUX) 168 via a 67-conductor data bus 170. The contents of the least-significant 32 bit positions and the next most-significant 32 bit positions of the P_REG 166 are conducted to a first and a second set of inputs, respectively, of a temporary multiplexer (T_MUX) 172 via a 32-conductor data bus 173a and a 32-conductor data bus 173b, respectively. A 32-bit temporary register (T_REG) 174 connected to the T_MUX 172 via a 32-conductor data bus 175 receives either the 32 least-significant bit contents of the P-register 166 or the 32 next most-significant bit contents of the P-register 166, respectively, in response to T select (T_SEL) and format adjust (FA) signals applied to input terminals of multiplier 10 and conducted to the T_MUX 172, in accordance with Table I, below. The 32-bit contents of the T-register 174 are conducted via a 32-conductor data bus 176 to a second input of the OUT_MUX 168. At a third input of the OUT_MUX 168, the 67-bit partial product word generated by the adder 152 is applied via a 67-conductor bus 178.

TABLE I

| Source Selection for the ith Bit Position of T REG 174 | | |
| --- | --- | --- |
| T SEL | FA | Source (via T MUX 172) |
| LOW | LOW | Bit Position i−1 of P_REG 166 |
| LOW | HIGH | Bit Position i of P_REG 166 |
| HIGH | LOW | Bit Position i+31 of P_REG 166 |
| HIGH | HIGH | Bit Position i+32 of P_REG 166 |

The T_REG 174 also receives an enable signal (ENT) applied to an input terminal of multiplier 10 which causes the contents of the T_REG to be generated on 32-bit conductor 176 during the next-following clock cycle. A result temporarily stored in T_REG 174 may be accordingly delayed by a selectable number of clock cycles.

In response to control signals generated by an output control (OPC), not shown, the OUT_MUX 168 causes the product of the 64-bit multiplicand and multiplier words applied to multiplier 10 to be generated at a set of thirty-two PROD_OUT$_{0-31}$ terminals of multiplier 10, with the assistance of T-register 174, as will be described below in connection with Table II.

The 32-×32-bit parallel multiplier 10 of the instant invention can perform a multiplication of two numbers represented by 64-bit words by sequentially applying first the least-significant, and then the most-significant 32-bit portions of the multiplicand, multiplier, respectively, to the DATA_IN_$X_{0-31}$, DATA_IN_$Y_{0-31}$ terminals, respectively of the multiplier 10. The XA_REG 102, respectively, the YA_REG 132, and the XB_REG 106, respectively, the YB_REG 136, will then store the least-significant and the most-significant, 32-bit portions of the multiplicand and multiplier words, XW0 and XW1, YW0 and YW1, respectively. A 128-bit product will subsequently be generated by the multiplier 10, represented as four 32-bit product words, PW3, PW2, PW1 and PW0; being respectively the most-significant 32-bit portion PW3, the next most-significant 32-bit portion PW2, the next to least-significant 32-bit portion PW1, and the least-significant 32-bit portion PW0.

The resulting product is sequentially generated at the PROD_OUT$_{0-31}$ terminals of the multiplier 10 so that the product word PW0 is first generated, followed by the product words PW1, PW2 and PW3. The full 128-bit product (PROD) being related to the four product words PW0, PW1, PW2 and PW3 by the equation:

$$PROD = (PW3 * 2^{96}) + (PW2 * 2^{64}) + (PW1 * 2^{32}) + PW0.$$

The value of the signal applied to the terminals, on the data bus, and the contents of the various registers within multiplier 10 during the extended-precision multiplication of two 64-bit numbers is best described with reference to Table II, below. One complete extended-precision multiplication is shown within the dashed lines in Table II beginning with the zeroth cycle of an external clock supplying synchronization signals to multiplier 10, and continuing through the sixth cycle of the clock. The value for the register, bus or terminal whose label appears in the rows of Table II is shown by the entry in the column corresponding to the clock cycle whose label appears at the top of the column. Those entries falling to the left of the left-most dashed line of Table II refer to the values remaining from the preceding extended-precision multiplication while those falling to the right of the right-most dashed line refer to the values pertaining to the next-following extended-precision multiplication. The purpose in showing these preceding and next-following values in Table II is to exhibit the manner in which a full 128-bit product, PROD, consisting of the four 32-bit product words PW0, PW1, PW2 and PW3, can be generated in four consecutinve clock cycles by the multiplier 10 of the instant invention by the application of the multiplicand and multiplier words at a clock cycle during which the previous product word PW1 is currently being generated by the multiplier 10. In this way, by appropriately "pipelining" the input operands, the multiplier 10 of the present invention can generate a complete extended-precision product every four cycles of the external clock.

As shown in Table II, signals representing the least-significant portion of the multiplicand word, XW0, and the multiplier word, YW0, are applied to the DATA_IN_X$_{0-31}$ and DATA_IN_Y$_{0-31}$ terminals, repsectively, of multiplier 10 at clock cycle 0. At the next clock cycle, 1, the XA_REG 102, the YA_REG 132, respectively, receive control signals causing these applied data signals to be stored in XA_REG 102 and YA_REG 132, respectively, as shown in rows 2 and 5, respectively, of Table II. Also at clock cycle 1, signals representing the most-significant portion of the multiplicand word, XW1, and the multiplier word, YW1, are applied to the DATA_IN_X$_{0-31}$ and the DATA_IN_Y$_{0-31}$ terminals, respectively, of multiplier 10. At the next clock cycle, 2, the XB_REG 106, the YB_REG 136, respectively, receive control signals causing these applied data signals to be stored in the XB_REG and the YB_REG, respectively, as shown in rows 3 and 6, respectively, of Table II.

During clock cycle 1, the contents of XA_REG 102 and YA_REG 132 are conducted via X_MUX 110 and Y_MUX 140, respectively, which have received control signals causing the signals corresponding to the 32-bit words XW0 and YW0, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW0 and YW0. The resulting 64-bit product XW0*YW0 is conducted via data bus 150 to the first input of the 67-bit adder 152. MUX 156 receives control signals causing the ZERO input signals applied thereto to be routed to the second input of the 67-bit adder 152. Control signals received by adder 152 cause the 64-bit product XW0*YW0 to PASS unchanged to the 67-bit P_REG 166, as shown in the 8th row of Table II, labelled "P_REG 166".

During the clock cycle 2, the contents of XB_REG 106 and YA_REG 132 are conducted via X_MUX 110 and Y_MUX 140, respectively, which have received control signals causing the signals corresponding to the 32-bit words XW1 and YW0, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW1 and YW0. The resulting 64-bit product XW1*YW0 is conducted via data bus 150 to the first input of the 67-bit adder 152.

Thirty-two bit shifter 160 receives control signals causing the 67-bit contents of the P_REG 166 conducted thereto on the wrap-back bus 158 to be right-shifted by 32-bit positions (i.e., the previous product XW0*YW0 is divided by $2^{32}$) and the results applied to MUX 156. MUX 156 receives control signals causing the signals corresponding to the resulting scaled producted to be routed to the second input of the 67-bit adder 152. Control signals received by adder 152 cause

TABLE II

| | 64-×64-Bit Multiplication Register, Bus, and Terminal Values | | | | | | |
|---|---|---|---|---|---|---|---|
| Register, Bus | Clock Cycle | | | | | | |
| Terminals | 0 | 1 | 2 | 3 | 4 | 5 | 6 |
| DATA_IN_X | XW0 | XW1 | | | XW0 | XW1 | |
| XA_REG 102 | XW0 | XW0 | XW0 | XW0 | XW0 | XW0 | XW0 |
| XB_REG 106 | XW1 | XW1 | XW1 | XW1 | XW1 | XW1 | XW1 |
| DATA_IN_Y | YW0 | YW1 | | | YW0 | YW1 | |
| YA_REG 132 | YW0 | YW0 | YW0 | YW0 | YW0 | YW0 | YW0 |
| YB_REG 136 | YW1 | YW1 | YW1 | YW1 | YW1 | YW1 | YW1 |
| DATA BUS 150 | XW1*YW1 | XW0*YW0 | XW1*YW0 | XW0*YW1 | XW1*YW1 | XW0*YW0 | XW1*YW0 |
| P_REG 166 | S/A | PASS | S/A | ACC | S/A | PASS | S/A |
| T_REG 174 | | PW3 | PW0 | | | PW3 | PW0 |
| PROD_OUT | PW1 | PW2 | PW3 | PW0 | PW1 | PW2 | PW3 | the 64-bit product XW1*YW0 to be added to the scaled previous product at the second input of adder 152 and the sum stored in the P_REG 166. These operations are shown in the 8th row of Table II by the entry "S/A" standing for shift of the previous product and add to current product.

Also during clock cycle 2, the 32 least-significant bit contents (prior to replacement by the just-mentioned sum) of the 67-bit P_REG 166 is applied to the 32-bit T_REG 174, as shown in the 9th row of Table II. This causes the least-significant product word PW0 to be stored temporarily in T_REG 174, since the results of the preceding 64-×64-bit multiplication has not be completely generated at the PROD_OUT$_{0-31}$ terminals of multiplier 10 as shown by the PW3 entry in the PROD_OUT row of Table II for clock cycle 2.

During e clock cycle 3, the contents of XA_REG 102 and YB_REG 136 are conducted via X_MUX 110 and Y_MUX 140, respectively, which have received control signals causing the signals corresponding to the 32-bit words XW0 and YW1, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW0 and YW1. The resulting 64-bit product XW0*YW1 is conducted via data bus 150 to the first input of the 67-bit adder 152.

The MUX 156 receives control signals causing the 67-bit contents of the P_REG 166 XW1*YW0 conducted thereto on the wrap-back bus 158 to be routed to the second input of the 67-bit adder 152. Control signals received by adder 152 cause the 64-bit product XW0*YW1 to be added to the previous product at the second input of adder 152 and the sum stored in the P_REG 166. These operations are shown in the 8th row of Table II by the entry "ACC" standing for add the previous product to current product.

Also during clock cycle 3, the least-significant product word PW0 stored temporarily in T_REG 174, to be conducted to OUT_MUX 168 and control signals received thereby causing the OUT_MUX 168 to route signals corresponding to PW0 to the PROD_OUT$_{0-31}$ terminals of multiplier 10 as shown by the PW0 entry in the PROD_OUT row of Table II for clock cycle 3.

During clock cycle 4, the contents of XB_REG 106 and YB_REG 136 are conducted via X_MUX 110 and Y_MUX 140, respectively, which have received control signals causing the signals corresponding to the 32-bit words XW1 and YW1, respectively, to be conducted on data busses 118 and 148, respectively, to the 32-×32-it multiplier array 120. As shown in row 7 of Table II, labelled "DATA BUS 150", the multiplier array 120 performs a multiplication of the operands XW1 and YW1. The resulting 64-bit product XW1*YW1 is conducted via data bus 150 to the first input of the 67-bit adder 152.

Thirty-two bit shifter 160 receives control signals causing the 67-bit contents of the P_REG 166 XW0*YW1 conducted thereto on the wrap-back bus 158 to be right-shifted by 32-bit positions (i.e., the previous accumulated product is divided by $2^{32}$) and the results applied to MUX 156. MUX 156 receives control signals causing the signals corresponding to the resulting scaled producted to be routed to the second input of the 67-bit adder 152. Control signals received by adder 152 cause the 64-bit product XW1*YW1 to be added to the scaled previous product at the second input of adder 152 and the sum stored in the P_REG 166. These operations are shown in the 8th row of Table II by the entry "S/A" standing for shift of the previous product and add to current product.

Also during clock cycle 4, the 67-bit contents of the 67-bit P_REG 166 to be conducted to OUT_MUX 168 and control signals received thereby causing the OUT_MUX 168 to route signals corresponding to the 32 least-significant bits thereof corresponding to PW1 to the PROD_OUT$_{0-31}$ terminals of multiplier 10 as shown by the PW1 entry in the PROD_OUT row of Table II for clock cycle 4.

During clock cycle 5, the 67-bit contents of the P_REG 166 continues to be applied to OUT_MUX 168 (prior to replacement by the least-significant product word PW0 from the next following 64-×64-bit multiplication) and control signals received thereby cause the OUT_MUX 168 to route signals corresponding to the 32 least-significant bits corresponding to PW2 to the PROD_OUT$_{0-31}$ terminals of multiplier 10 as shown by the PW2 entry in the PROD_OUT row of Table II for clock cycle 5.

Also during clock cycle 5, the 32 most-significant bit contents (prior to replacement by the just-mentioned next-following product word PW0) of the 67-bit P_REG 166 is stored in the 32-bit T_REG 174, as shown in the 9th row of Table II. This causes the most-significant product word PW3 to be stored temporarily in T_REG 174, since the next-to-the-most-significant product word PW2 is being currently generated at the PROD_OUT$_{0-31}$ terminals of multiplier 10 as just described. During clock cycle 6, the most-significant product word PW3 temporarily stored in T_REG 174 is conducted to OUT_MUX 168 and control signals received thereby causing the OUT_MUX 168 to route signals corresponding to PW3 to the PROD_OUT$_{0-31}$ terminals of multiplier 10 as shown by the PW3 entry in the PROD_OUT row of Table II for clock cycle 6.

As shown in Table II, the operands for the next-following 64-×64-bit multiplication are applied to multiplier 10 at clock cycles 4 and 5, thereby permitting the product corresponding to these operands to be generated at the PROD OUT$_{0-31}$ terminals beginning with clock cycle 7, by a sequence of steps identical with those described above, simply delayed by four clock cycles. In this manner, a full multiple-precision 128-bit product word can be generated every four consecutive clock cycles by the multiplier 10 of the instant invention from 64-bit multiplicand and multiplier words.

We claim:

1. A multiplier responsive to an external clock signal and a plurality of external control signals which cyclically processes a multiple-precision multiplicand word and a multiple-precision multiplier word and cyclically generates therefrom at an output an extended-pecision product word, comprising:

means for selectively generating double-precision partial product words from said multiplicand and multiplier words and a most-recently generated said double-precision partial product word;

means responsive to said external clock signal and to predetermined ones of said external control signals connected to said partial product generating means for storing a selected least-significant or next-most significant portion of said partial product words and for generating said selected portion at an output delayed by a selected number of periods of said external clock; and multiplier 10, represented as four 32-bit product words, PW3, PW2, PW1 and PW0; being respectively the most-significant 32-bit portion PW3, the next most-significant 32-bit portion PW2, the next to least-significant 32-bit portion PW1, and the least-significant 32-bit portion PW0.

The resulting product is sequentially generated at the PROD_OUT$_{0-31}$ terminals of the multiplier 10 so that the product word PW0 is first generated, followed by the product words PW1, PW2 and PW3. The full 128-bit product (PROD) being related to the four product words PW0, PW1, PW2 and PW3 by the equation:

$$PROD=(PW3 \cdot 2^{96})+(PW2 \cdot 2^{64})+(PW1 \cdot 2^{32})+PW0.$$

The value of the signal applied to the terminals, on the data bus, and the contents of the various registers within multiplier 10 during the extended-precision multiplication of two 64-bit numbers is best described with reference to Table II, below. One complete extended-precision multiplication is shown within the dashed lines in Table II beginning with the zeroth cycle of an external clock supplying synchronization signals to multiplier 10, and continuing through the sixth cycle of the clock. The value for the register, bus or terminal whose label appears in the rows of Table II is shown by the entry in the column corresponding to the clock cycle whose label appears at the top of the column. Those entries falling to the left of the left-most dashed line of Table II refer to the values remaining from the preceding extended-precision multiplication while those falling to the right of the right-most dashed line refer to the values pertaining to the next-following extended-precision multiplication. The purpose in showing these preceding and next-following values in Table II is to exhibit the manner in which a full 128-bit product, PROD, consisting of the four 32-bit product words PW0, PW1, PW2 and PW3, can be generated in four consecutinve clock cycles by the multiplier 10 of the instant invention by the application of the multiplicand and multiplier words at a clock cycle during which the previous product word PW1 is currently being generated by the multiplier 10. In this way, by appropriately "pipelining" the input operands, the multiplier 10 of the present invention can generate a complete extended-precision product every four cycles of the external clock.

As shown in Table II, signals representing the least-significant portion of the multiplicand word, XW0, and the multiplier word, YW0, are applied to the DATA_IN_X$_{0-31}$ and DATA_IN_Y$_{0-31}$ terminals, repsectively, of multiplier 10 at·clock cycle 0. At the next clock cycle, 1, the XA_REG 102, the YA_REG 132, respectively, receive control signals causing these applied data signals to be stored in XA_REG 102 and YA_REG 132, respectively, as shown in rows 2 and 5, respectively, of Table II. Also at clock cycle 1, signals representing the most-significant portion of the multiplicand word, XW1, and the multiplier word, YW1, are applied to the DATA_IN_X$_{0-31}$ and the DATA_IN_Y$_{0-31}$ terminals, respectively, of multiplier 10. At the next clock cycle, 2, the XB_REG 106, the YB_REG 136, respectively, receive control signals causing these applied data signals to be stored in the XB_REG and the YB_REG, respectively, as shown in rows 3 and 6, respectively, of Table II.

During clock cycle 1, the contents of XA_REG 102 and YA_REG 132 are conducted via X_MUX 110 and Y_MUX 140, respectively, which have received control signals causing the signals corresponding to the 32-bit words XW0 and YW0, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW0 and YW0. The resulting 64-bit product XW0*YW0 is conducted via data bus 150 to the first input of the 67-bit adder 152. MUX 156 receives control signals causing the ZERO input signals applied thereto to be routed to the second input of the 67-bit adder 152. Control signals received by adder 152 cause the 64-bit product XW0*YW0 to PASS unchanged to the 67-bit P_REG 166, as shown in the 8th row of Table II, labelled "P_REG 166".

During the clock cycle 2, the contents of XB_REG 106 and YA_REG 132 are conducted via X_MUX 110 and Y_MUX 140, respectively, which have received control signals causing the signals corresponding to the 32-bit words XW1 and YW0, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW1 and YW0. The resulting 64-bit product XW1*YW0 is conducted via data bus 150 to the first input of the 67-bit adder 152.

Thirty-two bit shifter 160 receives control signals causing the 67-bit contents of the P_REG 166 conducted thereto on the wrap-back bus 158 to be right-shifted by 32-bit positions (i.e., the previous product XW0*YW0 is divided by $2^{32}$) and the results applied to MUX 156. MUX 156 receives control signals causing the signals corresponding to the resulting scaled producted to be routed to the second input of the 67-bit adder 152. Control signals received by adder 152 cause

TABLE II

| Register, Bus Terminals | 64- × 64-Bit Multiplication Register, Bus, and Terminal Values |  |  |  |  |  |  |
|---|---|---|---|---|---|---|---|
|  | Clock Cycle |  |  |  |  |  |  |
|  | 0 | 1 | 2 | 3 | 4 | 5 | 6 |
| DATA_IN_X | XW0 | XW1 |  |  | XW0 | XW1 |  |
| XA_REG 102 | XW0 | XW0 | XW0 | XW0 | XW0 | XW0 | XW0 |
| XB_REG 106 | XW1 | XW1 | XW1 | XW1 | XW1 | XW1 | XW1 |
| DATA_IN_Y | YW0 | YW1 |  |  | YW0 | YW1 |  |
| YA_REG 132 | YW0 | YW0 | YW0 | YW0 | YW0 | YW0 | YW0 |
| YB_REG 136 | YW1 | YW1 | YW1 | YW1 | YW1 | YW1 | YW1 |
| DATA BUS 150 | XW1*YW1 | XW0*YW0 | XW1*YW0 | XW0*YW1 | XW1*YW1 | XW0*YW0 | XW1*YW0 |
| P_REG 166 | S/A | PASS | S/A | ACC | S/A | PASS | S/A |
| T_REG 174 |  | PW3 | PW0 |  |  | PW3 | PW0 |
| PROD_OUT | PW1 | PW2 | PW3 | PW0 | PW1 | PW2 | PW3 | the 64-bit product XW1*YW0 to be added to the scaled previous product at the second input of adder 152 and the sum stored in the P_REG 166. These operations are shown in the 8th row of Table II by the entry "S/A" standing for shift of the previous product and add to current product.

Also during clock cycle 2, the 32 least-significant bit contents (prior to replacement by the just-mentioned sum) of the 67-bit P_REG 166 is applied to the 32-bit T_REG 174, as shown in the 9th row of Table II. This causes the least-significant product word PW0 to be stored temporarily in T_REG 174, since the results of the preceding 64-×64-bit multiplication has not be completely generated at the PROD_OUT$_{0-31}$ terminals of multiplier 10 as shown by the PW3 entry in the PROD_OUT row of Table II for clock cycle 2.

During e clock cycle 3, the contents of XA_REG 102 and YB_REG 136 are conducted via X_MUX 110 and Y_MUX 140, respectively, which have received control signals causing the signals corresponding to the 32-bit words XW0 and YW1, respectively, to be conducted on data busses 118 and 148, respectively, to the 32-×32-bit multiplier array 120. As shown in row 7 of Table II, labelled "DATA BUS 150", the multiplier array 120 performs a multiplication of the operands XW0 and YW1. The resulting 64-bit product XW0*YW1 is conducted via data bus 150 to the first input of the 67-bit adder 152.

The MUX 156 receives control signals causing the 67-bit contents of the P_REG 166 XW1*YW0 conducted thereto on the wrap-back bus 158 to be routed to the second input of the 67-bit adder 152. Control signals received by adder 152 cause the 64-bit product XW0*YW1 to be added to the previous product at the second input of adder 152 and the sum stored in the P_REG 166. These operations are shown in the 8th row of Table II by the entry "ACC" standing for add the previous product to current product.

Also during clock cycle 3, the least-significant product word PW0 stored temporarily in T_REG 174, to be conducted to OUT_MUX 168 and control signals received thereby causing the OUT_MUX 168 to route signals corresponding to PW0 to the PROD_OUT$_{0-31}$ terminals of multiplier 10 as shown by the PW0 entry in the PROD_OUT row of Table II for clock cycle 3.

During clock cycle 4, the contents of XB_REG 106 and YB_REG 136 are conducted via X_MUX 110 and Y_MUX 140, respectively, which have received control signals causing the signals corresponding to the 32-bit words XW1 and YW1, respectively, to be conducted on data busses 118 and 148, respectively, to the 32-×32-it multiplier array 120. As shown in row 7 of Table II, labelled "DATA BUS 150", the multiplier array 120 performs a multiplication of the operands XW1 and YW1. The resulting 64-bit product XW1*YW1 is conducted via data bus 150 to the first input of the 67-bit adder 152.

Thirty-two bit shifter 160 receives control signals causing the 67-bit contents of the P_REG 166 XW0*YW1 conducted thereto on the wrap-back bus 158 to be right-shifted by 32-bit positions (i.e., the previous accumulated product is divided by $2^{32}$) and the results applied to MUX 156. MUX 156 receives control signals causing the signals corresponding to the resulting scaled producted to be routed to the second input of the 67-bit adder 152. Control signals received by adder 152 cause the 64-bit product XW1*YW1 to be added to the scaled previous product at the second input of adder 152 and the sum stored in the P_REG 166. These operations are shown in the 8th row of Table II by the entry "S/A" standing for shift of the previous product and add to current product.

Also during clock cycle 4, the 67-bit contents of the 67-bit P_REG 166 to be conducted to OUT_MUX 168 and control signals received thereby causing the OUT_MUX 168 to route signals corresponding to the 32 least-significant bits thereof corresponding to PW1 to the PROD_OUT$_{0-31}$ terminals of multiplier 10 as shown by the PW1 entry in the PROD_OUT row of Table II for clock cycle 4.

During clock cycle 5, the 67-bit contents of the P_REG 166 continues to be applied to OUT_MUX 168 (prior to replacement by the least-significant product word PW0 from the next following 64-×64-bit multiplication) and control signals received thereby cause the OUT_MUX 168 to route signals corresponding to the 32 least-significant bits corresponding to PW2 to the PROD_OUT$_{0-31}$ terminals of multiplier 10 as shown by the PW2 entry in the PROD_OUT row of Table II for clock cycle 5.

Also during clock cycle 5, the 32 most-significant bit contents (prior to replacement by the just-mentioned next-following product word PW0) of the 67-bit P_REG 166 is stored in the 32-bit T_REG 174, as shown in the 9th row of Table II. This causes the most-significant product word PW3 to be stored temporarily in T_REG 174, since the next-to-the-most-significant product word PW2 is being currently generated at the PROD_OUT$_{0-31}$ terminals of multiplier 10 as just described. During clock cycle 6, the most-significant product word PW3 temporarily stored in T_REG 174 is conducted to OUT_MUX 168 and control signals received thereby causing the OUT_MUX 168 to route signals corresponding to PW3 to the PROD_OUT$_{0-31}$ terminals of multiplier 10 as shown by the PW3 entry in the PROD_OUT row of Table II for clock cycle 6.

As shown in Table II, the operands for the next-following 64-×64-bit multiplication are applied to multiplier 10 at clock cycles 4 and 5, thereby permitting the product corresponding to these operands to be generated at the PROD OUT$_{0-31}$ terminals beginning with clock cycle 7, by a sequence of steps identical with those described above, simply delayed by four clock cycles. In this manner, a full multiple-precision 128-bit product word can be generated every four consecutive clock cycles by the multiplier 10 of the instant invention from 64-bit multiplicand and multiplier words.

We claim:

1. A multiplier responsive to an external clock signal and a plurality of external control signals which cyclically processes a multiple-precision multiplicand word and a multiple-precision multiplier word and cyclically generates therefrom at an output an extended-pecision product word, comprising:

means for selectively generating double-precision partial product words from said multiplicand and multiplier words and a most-recently generated said double-precision partial product word;

means responsive to said external clock signal and to predetermined ones of said external control signals connected to said partial product generating means for storing a selected least-significant or next-most significant portion of said partial product words and for generating said selected portion at an output delayed by a selected number of periods of said external clock; and first multiplexer means responsive to predetermined ones of said external control signals connected to said partial product generating means, and to said storage and delay means for selectively conducting the contents of selected portion therefrom to said extended-precision multiplier output;

whereby said extended-precision product word is formed of single-precision ones of said partial product words generated at said multiplier output during successive ones of said external clock periods.

2. An extended-precision multiplier according to claim 1 wherein said partial product generating means includes:

combinatorial multiplication means for generating the product of single-precision portions of said multiplicand and multiplier words;

means having first and second inputs connected to said combinatorial multiplication means for combining said product of said single-precision portions and the most-recently generated said double-precision partial product word into said double-precision partial product word;

register means responsive to said external clock signal connected to said combining means for storing said double-precision partial product words, upon reception of said external clock signal and for generating at an output said stored word; and a wrap-back path connecting said register means output to said second input of said combining means.

3. An extended-precision multiplier according to claim 2 wherein said combining means includes:

means responsive to said double-precision product word received at said second input of said combining means for scaling said word by a predetermined amount;

second multiplexer means responsive to said scaled and to said unscaled double-precision product word and to a word corresponding to numerical zero for selectively conducting one of said words to an output; and means having a first input connected to said first input of said combining means and having a second input connected to said second multiplexer output for adding said words received at said first and second inputs and generating said double-precision partial product.

4. An extended-precision multiplier according to claim 1 further including input register means responsive to said external clock signal for storing a single-precision least-significant and a single-precision most-significant portion of said multiplicand and multiplier words wherein said partial product generating means is connected to said input register means and generates said double-precision partial product words from predetermined ones of said most-significant and least-significant portions of said multiplicand and multiplier words.

5. An extended-precision multiplier according to claim 4 wherein said partial product generating means has a first and a second input, said input register means includes a first multiplicand register for storing said least-significant single-precision portion of said multiplicand word and a second multiplicand register for storing said most-significant single-precision portion of said multiplicand word, and wherein said extended-precision multiplier further includes:

multiplicand multiplexer means responsive to predetermined ones of said external control signals connected to said first and second multiplicand registers for selectively conducting the contents of said registers to said first input of said partial product generating means.

6. An extended-precision multiplier according to claim 4 wherein said partial product generating means has a first and a second input, said input register means includes a first multiplier register for storing said least-significant single-precision portion of said multiplier word and a second multiplier register for storing said most-significant single-precision portion of said multiplier word, and wherein said extended-precision multiplier further includes:

multiplier multiplexer means responsive to predetermined ones of said external control signals connected to said first and second multiplier registers for selectively conducting the contents of said registers to said second input of said partial product generating means.

7. An extended-precision multiplier according to claim 1 wherein said storage and delay means comprises:

multiplexer means responsive to predetermined ones of said external control signals connected to said partial product generating means for selectively generating at an output a least-significant or a most-significant portion of said partial product word; and register means responsive to said external clock signal and to predetermined ones of said external control signals connected to said multiplexer means output for generating at an output said selected partial product word at the clock cycle next-following application of said predetermined external control signals.

8. A method of cyclically processing two multiple-precision operand words each comprising a plurality of single-precision words and generating therefrom an extended-precision product, comprising the steps of:

(a) forming a double-precision product of a least-significant one of said single-precision operand words, during an nth cycle;

(b) temporarily storing said double-precision product formed at step (a), during an n+1st cycle;

(c) forming a double-precision cross-product of predetermined ones of said single-precision operand words, during said n+1st cycle;

(d) arithmetically combining said double-precision cross-product formed at step (c) with predetermined ones of said previously stored double-precision products arithmetically scaled by a predetermined amount, during said n+1st cycle;

(e) temporarily storing a least-significant single-precision portion of said double-precision product formed in step (d), during an n+2nd cycle;

(f) temporarily storing said double-precision word formed at step (d), during said n+2nd cycle;

(g) generating during an n+3rd cycle said least-significant single-precision product word temporarily stored at step (e);

(h) incrementing n by 2 and repeating steps (c), (d) and (f), a predetermined number m times $0 < = m$;

(i) generating during an (n+2m)th cycle a least-significant single-precision portion of said double-precision product temproarily stored at step (f);

(j) repeating steps (h) and (i) a predetermined number p times, $0 < = p$;

(k) temporarily storing a most-significant single-precision portion of said double-precision product temporarily stored at step (f), during an (n+2mp) cycle; and (l) generating during an (n+2mp+1)st cycle said single-precision word temporarily stored at step (k).

9. An extended-precision multiplication method according to claim 8 wherein said multiple-precision operand words are double-precision words each comprising a least-significant and a most-significant single-precision word portion, and wherein said value p=0.

10. An extended-precision multiplication method according to claim 9 further including the step of initiating during said n+2nd cycle of said present multiplication another said extended-precision multiplication at step (a) concurrently with a present multiplication.

* * * * *